US008595563B2

(12) United States Patent
Tsien et al.

(10) Patent No.: US 8,595,563 B2
(45) Date of Patent: Nov. 26, 2013

(54) METHOD AND CIRCUITRY FOR DEBUGGING A POWER-GATED CIRCUIT

(75) Inventors: Benjamin Tsien, Fremont, CA (US); Kiran Bondalapati, Los Altos, CA (US); Hao Huang, Austin, TX (US); William A. Hughes, San Jose, CA (US); Eric Rentschler, Steamboat Springs, CO (US); Jeremy Schreiber, Austin, TX (US); Aaron J. Grenat, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 316 days.

(21) Appl. No.: 13/184,982

(22) Filed: Jul. 18, 2011

(65) Prior Publication Data
US 2013/0024829 A1    Jan. 24, 2013

(51) Int. Cl.
G06F 11/00 (2006.01)
(52) U.S. Cl.
USPC .............................. 714/45; 714/35
(58) Field of Classification Search
USPC ........................... 714/30, 35, 45, 48
See application file for complete search history.

(56) References Cited

U.S. PATENT DOCUMENTS

| 6,282,662 | B1* | 8/2001 | Zeller et al. | 713/300 |
| 7,725,750 | B2* | 5/2010 | Ashish et al. | 713/323 |
| 8,448,001 | B1* | 5/2013 | Zhu et al. | 713/322 |
| 2007/0226561 | A1* | 9/2007 | Padhye et al. | 714/726 |
| 2008/0307244 | A1* | 12/2008 | Bertelsen et al. | 713/323 |
| 2011/0302460 | A1* | 12/2011 | Idgunji et al. | 714/55 |

* cited by examiner

Primary Examiner — Marc Duncan
(74) Attorney, Agent, or Firm — Volpe and Koenig, P.C.

(57) ABSTRACT

Described are a circuit and a method of analyzing and correcting a fault occurring in operation of the circuit during a power gating sequence. The method includes executing a modification of the power gating sequence that includes maintaining operation of a trace capture buffer (TCB); recording, in the TCB, events occurring during the executing; and correcting the fault based on analysis of the events recorded in the TCB. The circuit includes a plurality of components including a TCB, and a switch configured to maintain power to the TCB in a first state and turn off power to the TCB in a second state.

20 Claims, 3 Drawing Sheets

METHOD AND CIRCUITRY FOR DEBUGGING A POWER-GATED CIRCUIT

FIELD OF INVENTION

This disclosure is related to electronic circuits.

BACKGROUND

Power gating is a technique for reducing power consumption in electronic circuits, including integrated circuits (ICs). The technique involves separating components, or subcircuits, of a circuit into various domains and temporarily turning off power to some or all domains when the components in those domains are idling. A component is idling when it does not have to function. Power gating is a function that enables conservation of power during operation of an IC in a device.

Tracing is a technique in which events occurring during operation of a circuit are recorded and stored. The events may be recorded at least temporarily in a trace capture buffer or some other type of storage device. If a circuit fault occurs, such stored events may be useful for diagnosing and remedying the fault. Tracing is particularly useful in debugging newly designed ICs.

SUMMARY OF EMBODIMENTS

A method of analyzing and correcting a fault occurring in operation of a circuit during a power gating sequence is described. The method includes executing a modification of the power gating sequence in which operation of a trace capture buffer (TCB) is maintained; and recording, in the TCB, events occurring during the executing of the modification of the power gating sequence.

Also described is a circuit configured to enable analyzing and correcting of a fault occurring in the circuit during a power gating sequence. The circuit includes a trace capture buffer (TCB) configured to record events occurring during operation of the circuit and a switch configured to maintain power to the TCB in a first state and turn off power to the TCB in a second state.

DETAILED DESCRIPTION OF EMBODIMENTS

Portions of the following description are related to methods and circuitry described in U.S. patent application Ser. No. 12/951,500, which is hereby incorporated by reference as if fully set forth herein.

Combining power gating and tracing raises new challenges. For example, if the storage device itself is power-gated and a fault occurs in the circuit, events leading up to the fault may not be captured, making diagnosis and remedying of the fault difficult or impossible.

Figure 1:
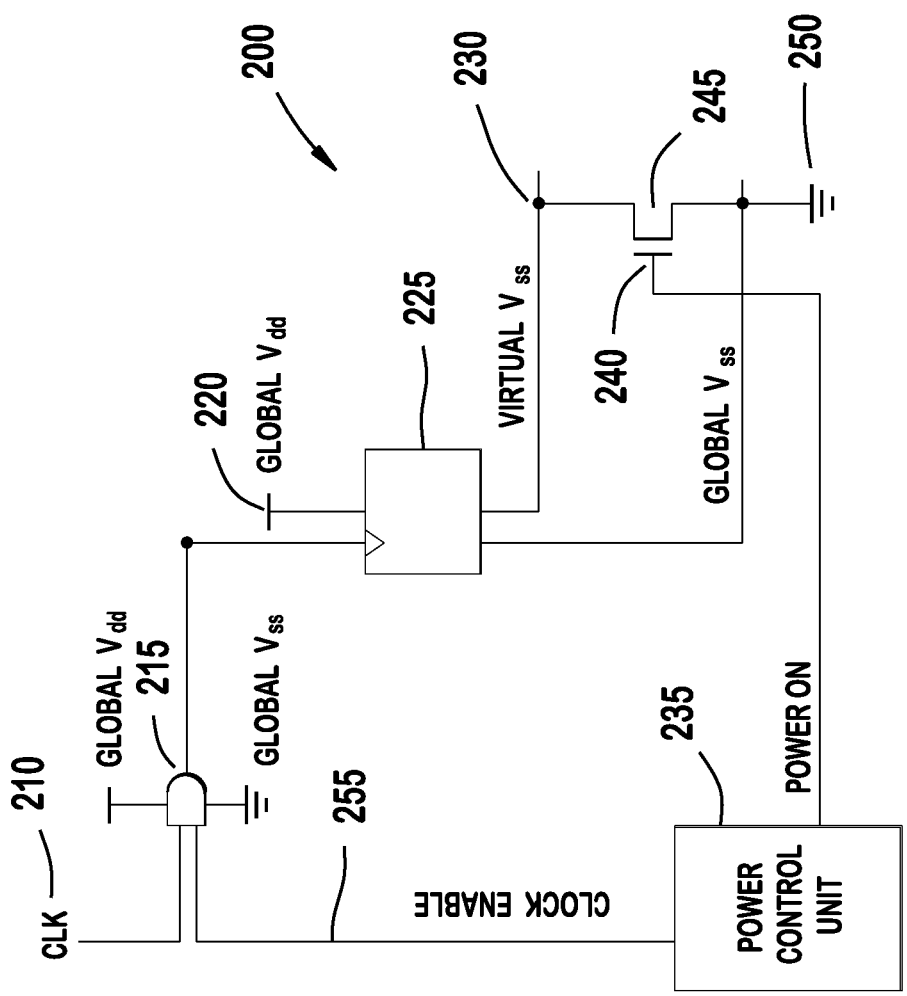
FIG. 1 shows an example arrangement for power gating.

An example of an arrangement for power gating may be described by referring to FIG. 1. In FIG. 1, the symbols $V_{dd}$ and $V_{ss}$ are to be interpreted as labels, without implying anything about relative or absolute polarities. Circuit 225 is configured for power gating, and comprises a plurality of components (not shown) situated in different domains. Each domain, and the components within it, is connected between two voltage planes, from which it receives power. Power gating of circuit 225 is done by turning off power to at least some domains, and therefore to the components in those domains, while these components are idle.

In a non-limiting embodiment shown in FIG. 1, circuit 225 is powered by being connected between two voltage planes differing in potential. All domains of circuit 225 are connected to one common voltage plane, Global $V_{dd}$ 220. Some domains of circuit 225 are connected to global $V_{ss}$ 250. Global $V_{ss}$ is shown in FIG. 1 as ground, but is not necessarily limited to be ground. Those domains of circuit 225 directly connected to global $V_{ss}$ 250 cannot be power-gated.

Other domains of circuit 225 are connected to a plane called virtual $V_{ss}$, 230. Virtual $V_{ss}$ is electrically connected to Global $V_{ss}$ through a switch 245. Switch 245 allows power gating of these other domains of circuit 225 and hence of the components within those domains. When switch 245 is closed, components in the domain connected to virtual $V_{ss}$ are connected to global $V_{ss}$ and are fully powered. When switch 245 is open, however, components in domains connected to virtual $V_{ss}$ are not connected to global $V_{ss}$ and are therefore not powered. In this manner, those components connected to virtual $V_{ss}$ may be turned off, or power gated, when their operation is not required. Although circuit 225 is shown and described as having two domains, this is not to be construed as limiting. The number of domains in a circuit such as 225 is not limited to two but may be any number. Likewise, the number of voltage planes and the number of distinct voltages present on voltage planes is arbitrary and not limited. Likewise, the number of components in a domain is arbitrary and not limited.

Switch 245 may be opened and closed by a processor 235, called Power Control Unit in FIG. 1. In the example of FIG. 1, switch 240 is shown as an MOS transistor, with processor 235 supplying voltage to its gate 240. However, switch 245 is not limited to being an MOS transistor.

Circuit 225 may be a clocked circuit. A full power gating sequence for circuit 225 may include stopping a clock signal to circuit 225, followed by stopping power supplied to the circuit by opening switch 245, as described above. Bringing circuit 225 back into operation may involve restoring its power by closing switch 245, followed by restoring the clock signal.

FIG. 1 shows a non-limiting example of processor 235 controlling the clock signal to circuit 225, in addition to controlling switch 245. The clock signal is provided by a clock 210. The clock signal is applied to one input of an AND gate 215, the AND gate 215 powered by being connected between global $V_{dd}$ and global $V_{ss}$. Processor 235 provides a clock enable level 255 to a second input of AND gate 215. If clock enable signal 255 is a logical "1", then AND gate 215 operates to apply the clock signal to circuit 225. If clock enable level 255 is a logical "0", AND gate 215 operates such that no clock signal is applied to circuit 225. In this way, processor 235 may be programmed to control both clock signal and power to circuit 225 in a power-gating sequence.

Figure 2:
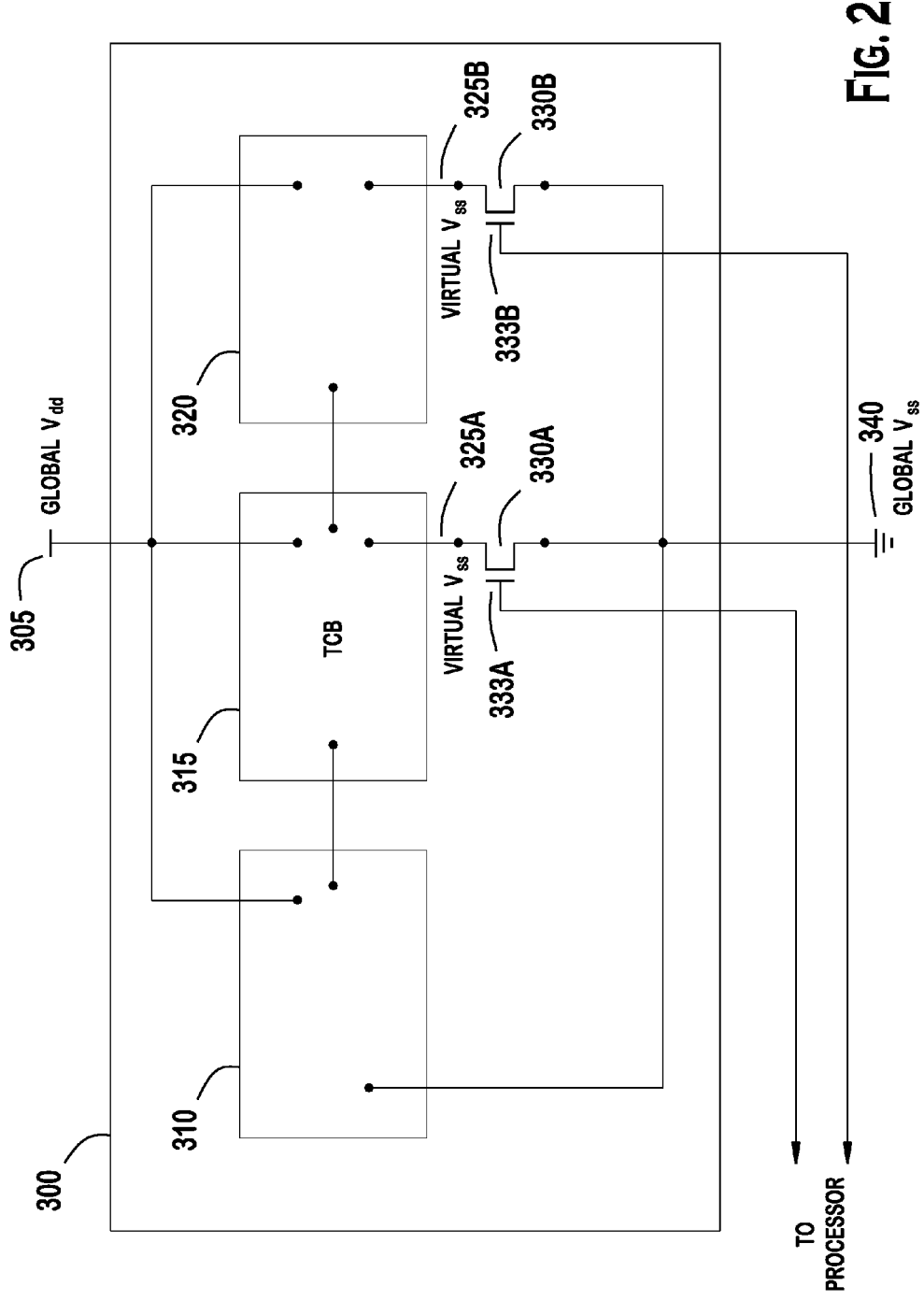
FIG. 2 shows an embodiment of a circuit configured to perform both power gating and tracing.

FIG. 2 shows an embodiment of a circuit 300 configured for power gating and configured to enable analyzing and correcting of a fault occurring in the circuit 300 during power gating of the circuit 300. In an embodiment, circuit 300 is an integrated circuit. In a particular embodiment, circuit 300 is a northbridge. Alternatively, circuit 300 may be configured outside a northbridge but control power-gating of the northbridge. A northbridge is an integrated circuit used in the core logic of a computer. It may handle communication between other circuits in a computer, such as a central processing unit (CPU), random access memory (RAM), basic input-output system read-only memory (BIOS-ROM), video card, and another circuit in the core logic known as a southbridge.

Circuit 300 includes a plurality of voltage domains, components, or subcircuits, 310, 315 and 320, referred to henceforth as components. Although three components are shown, circuit 300 is not limited to three components—circuit 300 may contain any number of components. At least one component, 315, is a trace capture buffer (TCB) electrically coupled to other components such as 310 and 320. TCB 315 is configured to record events occurring during operation of circuit 300. In particular, TCB 315 may be configured to record events that occur leading up to and/or during power gating of circuit 300. An example of such an event is a stepwise logic sequence captured in the power control unit leading up to power gating. Other examples include external events, e.g. from an on-die integrated GPU, located outside the voltage or power gating domain. Circuit 300 may be powered by two voltage planes, such as Global $V_{dd}$ 305 and Global $V_{ss}$ 340. In FIG. 2, Global $V_{ss}$ 340 is shown as ground, but this is not to be construed as limiting. Voltage planes 305 and 340 may each be of either polarity, positive or negative, relative to some reference potential, as long as they are at different potentials. For definiteness hereafter, in describing FIG. 2, the terms Global $V_{dd}$ and Global $V_{ss}$ will refer to voltage planes 305 and 340, respectively, irrespective of any polarity imposed on these two voltage planes.

Circuit 300 includes two switches 330A and 330B connected, respectively, on one side, to TCB 315 and component 320. Opposite sides of switches 330A and 330B are both connected to Global $V_{ss}$ 340. Switches 330A and 330B each have two states, a closed, or conducting state, ideally having zero resistance, and an open, or highly resistive state, ideally having infinite resistance. Switches 330A and 330B may be independently switched between their two states by a processor indicated, but not shown, in FIG. 2. Switches 330A and 330B are depicted schematically as MOS transistors, but are not limited to being so. In an embodiment in which switches 330A and 330B are MOS transistors, they may each be switched between their open and closed states by the processor by applying different voltages to each gate 333A and 333B. Corresponding to the description above, TCB 315 and component 320 may be described as being connected to virtual $V_{ss}$ voltage planes 325A and 325B, respectively. By contrast, component 310 has no such connected switch and is connected only to global $V_{ss}$ 340.

Circuit 300 is configured for executing a regular power gating sequence using switches 330A and 330B. For example, maximum power gating in circuit 300 may be achieved by a power gating sequence that includes switching both switches 330A and 330B to their open state to turn off both TCB 315 and component 320, respectively. A modification of the regular power gating sequence may be executed by having the processor run the regular power gating sequence except that in the modification, switch 330A is kept in its closed state, thus maintaining power to the TCB. In an embodiment, the processor may execute a modification of a power gating sequence by performing all the steps of the sequence preceding, but not including, turning off power to the TCB. In a modified sequence, the TCB may record events occurring during modified the power gating sequence. The recorded events may be analyzed to diagnose a fault occurring in the power gating sequence.

Figure 3:
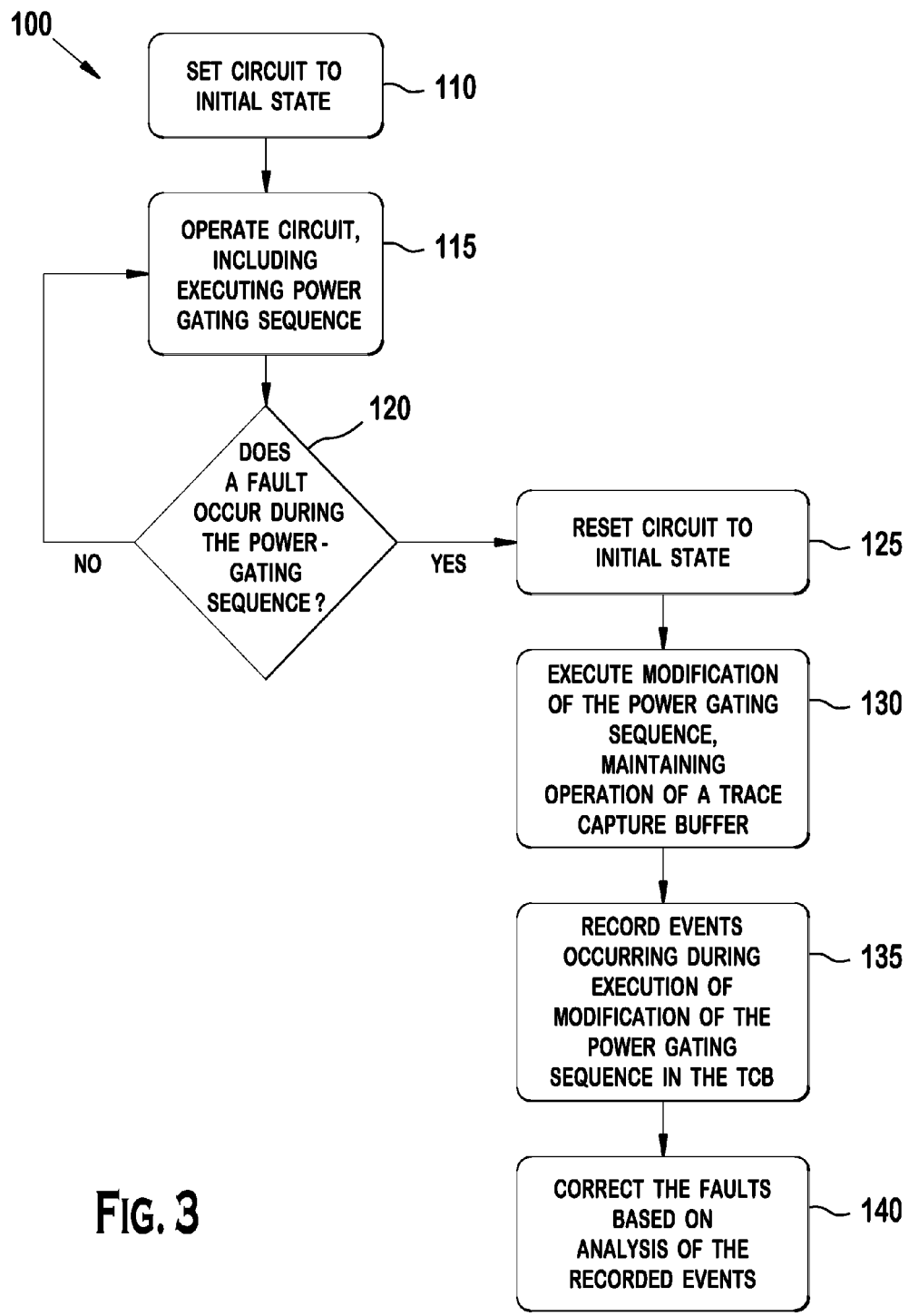
FIG. 3 is a flowchart showing a method of analyzing and correcting a fault occurring in operation of a circuit.

FIG. 3 shows an embodiment of a method 100 of analyzing and correcting (debugging) a fault occurring in a circuit during power gating. A method such as that shown in FIG. 3 may be applied in the testing of a newly fabricated integrated circuit in order to detect and correct errors in, as examples, the circuit design, circuit layout, or fabrication process.

The circuit is set to an initial state 110. The circuit is then operated in its normal manner 115. The normal operation of the circuit includes executing, at some point, a power gating sequence, in which power is temporarily not supplied to at least a portion of the circuit, as described above. Operation of the circuit is monitored before, during, and after execution of the power gating sequence to determine whether a fault occurs 120. As long as monitoring 120 shows that the circuit operates correctly, without occurrence of a fault, during and after the power gating sequence, then normal circuit operation continues—NO of 120. On the other hand, a fault may occur in the operation of the circuit during the power gating sequence. For example, the circuit may enter a locked, or frozen, state and cease to function at all, requiring a manual reset.

On a condition that a fault occurs during or after execution of the power gating sequence—YES of 120—then circuit operation is stopped. The circuit is reset to the initial state 125. After the circuit is reset to the initial state 125 its operation is restarted, but now the circuit is set so that its operation includes executing a modification of the power gating sequence 130 instead of the normal power gating sequence. In this modification of the power gating sequence, operation of a trace capture buffer (TCB) is maintained 130. Operation of the TCB may be maintained by maintaining power to the TCB while gating (turning off) power to other parts of the circuit. Since the TCB is still operating, it may record events occurring in the circuit or external to the circuit during the executing of the modified power of the modified power gating sequence 135. The fault may then be corrected or eliminated based on analysis of the events recorded in the TCB.

In an embodiment, executing the modification of the power gating sequence may include performing some or all actions in the regular power gating sequence except actual removal of power from the TCB. Executing the modification of the power gating sequence may include performing some or all actions in the power gating sequence that precede actual removal of power from the TCB. Specifically, the power gating sequence may include removal of power from the TCB, whereas the modification of the power gating sequence does not include the removal of power from the TCB. Whether power to the TCB is maintained or turned off may be determined by the state of a switch, as described above. The switch may be integrated in the circuit or may be external to the circuit. Likewise, the TCB may be integrated in the circuit or may be external to the circuit. The state of the switch may be changed by a processor.

In an embodiment, method 100 may be applied if the circuit being power gated is a northbridge.

Embodiments of the present embodiments may be represented as instructions and data stored in a non-transitory computer-readable storage medium. For example, aspects of the present embodiments may be implemented using Verilog, which is a hardware description language (HDL). When processed, Verilog data instructions may generate other intermediary data (e.g., netlists, GDS data, or the like) that may be used to perform a manufacturing process implemented in a semiconductor fabrication facility. The manufacturing process may be adapted to manufacture semiconductor devices (e.g., processors) that embody various aspects of the present embodiments.

Suitable processors include, by way of example, a general purpose processor, a special purpose processor, a conventional processor, a digital signal processor (DSP), a plurality of microprocessors, a graphics processing unit (GPU), a DSP core, a controller, a microcontroller, application specific integrated circuits (ASICs), field programmable gate arrays (FPGAs), any other type of integrated circuit (IC), and/or a state machine, or combinations thereof.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method of analyzing and correcting a fault occurring in operation of a circuit during a power gating sequence, the method comprising:
    executing a modification of the power gating sequence comprising maintaining operation of a trace capture buffer (TCB);
    recording, in the TCB, events occurring during the executing; and
    correcting the fault based on analysis of the events recorded in the TCB.

2. The method of claim 1, wherein the circuit is a northbridge.

3. The method of claim 1, wherein maintaining operation of the TCB comprises maintaining power to the TCB.

4. The method of claim 3, wherein maintaining power to the TCB comprises changing a state of a switch.

5. The method of claim 4, wherein changing the state of the switch is performed by a processor.

6. The method of claim 4, wherein at least one of the switch or the TCB is integrated in the circuit.

7. The method of claim 1, wherein the power gating sequence comprises removal of power from the TCB and wherein the modification of the power gating sequence does not include the removal of power from the TCB.

8. A method of analyzing and correcting a fault occurring in operation of a circuit during a power gating sequence, the method comprising:
    setting the circuit to an initial state;
    operating the circuit, the operating including executing the power gating sequence; and
    on a condition that the fault occurs during the power gating sequence:
        resetting the circuit to the initial state;
        executing a modification of the power gating sequence comprising maintaining operation of a trace capture buffer (TCB);
        recording, in the TCB, events occurring during the executing; and
        correcting the fault based on analysis of the events recorded in the TCB.

9. The method of claim 8, wherein the circuit is a northbridge.

10. The method of claim 8, wherein maintaining operation of the TCB comprises maintaining power to the TCB.

11. The method of claim 10, wherein maintaining power to the TCB comprises changing a state of a switch.

12. The method of claim 11, wherein changing the state of the switch is performed by a processor.

13. The method of claim 8, wherein the executing of the modification of the power gating sequence comprises performing actions in the power gating sequence that precede actual removal of power from the TCB.

14. A circuit configured to enable analyzing and correcting of a fault occurring in the circuit during a power gating sequence, the circuit comprising:
    a plurality of components including a trace capture buffer (TCB), the TCB configured to record events occurring during operation of the circuit; and
    a switch configured to maintain power to the TCB in a first state and turn off power to the TCB in a second state;
    wherein the circuit is configured to:
        maintain operation of the TCB during the execution of a modification of the power gating sequence; and
        record, in the trace capture buffer, events that occur during the execution of the modification of the power gating sequence.

15. The circuit of claim 14 configured as an integral part of a northbridge.

16. The circuit of claim 14 configured outside a northbridge.

17. The circuit of claim 14, wherein the switch is configured to receive and act on instructions from a processor to switch between the first and second states.

18. A non-transitory computer-readable storage medium comprising instructions and data that are acted upon by a program executable on a computer system, the program operating on the instructions and data to perform a portion of a process to fabricate an integrated circuit including circuitry described by the data, the circuitry described by the data comprising:
    a plurality of components including a trace capture buffer (TCB), the TCB configured to record events occurring during operation of the circuit; and
    a switch configured to maintain power to the TCB in a first state and turn off power to the TCB in a second state;
    wherein the circuitry is configured to:
        maintain operation of the TCB during the execution of the modification of the power gating sequence; and
        record, in the TCB, events that occur during the execution of the modification of the power gating sequence.

19. The computer-readable medium of claim 18, wherein the integrated circuit comprises a northbridge.

20. The computer-readable medium of claim 18, wherein the switch described by the data is configured to receive and act on instructions from a processor to switch between the first and second states.

* * * * *